(12) United States Patent
Wikstrand et al.

(10) Patent No.: US 10,799,842 B2
(45) Date of Patent: Oct. 13, 2020

(54) TWO-COMPONENT PAINT SYSTEM

(71) Applicant: PARAGON NORDIC AB, Vallentuna (SE)

(72) Inventors: Carl Tommy Wikstrand, Alingsås (SE); Kristian Karjus, Solna (SE); Malin Burstedt, Vallentuna (SE); Mats Silvander, Upplands Väsby (SE)

(73) Assignee: PARAGON NORDIC AB, Vallentuna (SE)

( * ) Notice: Subject to any disclaimer, the term of this patent is extended or adjusted under 35 U.S.C. 154(b) by 248 days.

(21) Appl. No.: 15/565,881

(22) PCT Filed: Feb. 10, 2016

(86) PCT No.: PCT/SE2016/050099
§ 371 (c)(1),
(2) Date: Oct. 11, 2017

(87) PCT Pub. No.: WO2016/175693
PCT Pub. Date: Nov. 3, 2016

(65) Prior Publication Data
US 2018/0056260 A1    Mar. 1, 2018

(30) Foreign Application Priority Data

Apr. 28, 2015  (SE) ...................... 1550507

(51) Int. Cl.
*B01F 15/02*    (2006.01)
*B65D 83/42*    (2006.01)
(Continued)

(52) U.S. Cl.
CPC ...... *B01F 15/0225* (2013.01); *B01F 13/0052* (2013.01); *B01F 15/00512* (2013.01);
(Continued)

(58) Field of Classification Search
None
See application file for complete search history.

(56) References Cited

U.S. PATENT DOCUMENTS 3,291,348 A    12/1966    Chibret et al.
3,343,718 A  *  9/1967    Siegel ................. B65D 83/682
                                                        222/1

(Continued)

FOREIGN PATENT DOCUMENTS

DE    102013019085 A1    5/2014
EP       0030840 A1      6/1981
(Continued)

OTHER PUBLICATIONS

D.A. Bayliss et al., Paints and paint coatings, Chapter 4 from Steelwork Corrosion Control, Second Edition, CRC Press, pp. 1-50 (2002).

(Continued)

*Primary Examiner* — Michael P. Rodriguez
(74) *Attorney, Agent, or Firm* — Porter Wright Morris & Arthur LLP

(57) ABSTRACT

A two-component paint system (1) comprises a medium pressure canister (10) with a paint, at least one solvent and at least one propellant, and a high pressure canister (20) with a hardener, at least one solvent, at least one propellant and an inert gas or inert gas mixture. An adapter (30) is configured to transfer the content of the high pressure canister (20) into the content of the medium pressure canister (10). The internal pressure of the high pressure canister (20) is at least 2 bars higher than the internal pressure of the medium pressure canister (10).

45 Claims, 7 Drawing Sheets

(51) Int. Cl.
  *C09D 163/00* (2006.01)
  *C09D 175/04* (2006.01)
  *B01F 15/00* (2006.01)
  *C08G 59/50* (2006.01)
  *C09D 7/20* (2018.01)
  *C09D 7/63* (2018.01)
  *B01F 13/00* (2006.01)
  *B05D 1/02* (2006.01)
  *C08G 18/08* (2006.01)
  *C08G 18/62* (2006.01)

(52) U.S. Cl.
  CPC ............... *B05D 1/02* (2013.01); *B65D 83/42* (2013.01); *C08G 59/50* (2013.01); *C09D 7/20* (2018.01); *C09D 7/63* (2018.01); *C09D 163/00* (2013.01); *C09D 175/04* (2013.01); *B01F 2215/005* (2013.01); *C08G 18/08* (2013.01); *C08G 18/62* (2013.01); *C08G 2150/90* (2013.01)

(56) References Cited

U.S. PATENT DOCUMENTS

| 2001/0014700 A1 | 8/2001 | Kwasny |
| 2005/0178464 A1 | 8/2005 | Greer, Jr. et al. |

FOREIGN PATENT DOCUMENTS

| EP | 0269068 A2 | 11/1987 |
| JP | 2001-206466 A | 7/2001 |
| WO | 2010/077720 A2 | 7/2010 |
| WO | 2014/200615 A1 | 12/2014 |

OTHER PUBLICATIONS

Supplementary European Search Report dated Dec. 10, 2018 from corresponding European Application No. 16786847.0.

\* cited by examiner

TWO-COMPONENT PAINT SYSTEM

TECHNICAL FIELD

The present embodiments generally relate to a two-component paint system, and in particular to such a two-component paint system producing paint coatings with excellent characteristics.

BACKGROUND

Two-component paints are based on a well-known technique where a paint and a hardener are premixed either manually or through a gear pump or similar. The resulting paint mixture is then sprayed onto a surface with a gun applicator or other equipment. Two-component paints generally give durable coatings which are characterized by a very high level of corrosion resistance.

SprayMax by Peter Kwasny GmbhH is a two-component paint system that is available on the market. It uses an aerosol canister for two-component paint applications. In this two-component paint system, the hardener is prefilled in a separate cylinder inside the aerosol canister, which is broken after the paint is transferred from the bottom of the aerosol canister. A disadvantage with this two-component paint system is that the hardener is not optimized for all specific paints. Accordingly, this product does not produce optimal results for various types of paints.

US 2001/0014700 by Peter Kwasny GmbhH discloses an aerosol preparation for two-component paint spray cans. The paint material consists of acrylic resins containing OH-groups and the hardener consists of aliphatic polyisocyanates. The paint material and the hardener are filled in different containers within a spray can and are united only immediately before they are processed and jointly sprayed from the spray can via a propellant consisting of a propane/butane mixture. The weight ratio of the diluted paint material to the propellant amounts to from 75:25 to 70:30.

DE 10 2013 019 085 by Stadmar Ltd. discloses a two-component paint system with a first canister with a paint and a propellant and a second canister with a hardener and a pressurizing gas. The pressure in the second canister exceeds 7 bars and the pressure in the first canister is 3.5-4.5 bar. The content of the second canister is transferred into the first canister using an adapter. Metal balls are present inside the first canister and are used to mix the contents from the two canisters to form a two-component paint. The two-component paint has, though, low resistance to wear as assessed using a MEK test.

Using an aerosol for application of two-component paints is a cost effective, environmental-friendly and easy way of applying two-component paints. There is therefore a need for a two-component paint system capable of producing paint coatings with excellent characteristics.

SUMMARY

It is a general objective to provide an improved two-component paint system.

It is a particular objective to provide a two-component paint system producing paint coatings with improved characteristics.

These and other objectives are met by embodiments disclosed herein.

An aspect of the embodiments relates to a two-component paint system comprising a medium pressure canister, a high pressure canister and an adapter. The medium pressure canister comprises a paint, at least one solvent, and at least one propellant. The high pressure canister comprises a hardener, at least one solvent, at least one propellant, and an inert gas or inert gas mixture. The adapter is configured to transfer the content of the high pressure canister into the content of the medium pressure canister. The high pressure canister has an internal pressure that is at least 2 bars higher than an internal pressure of the medium pressure canister.

Another aspect of the embodiments relates to a method of coating a surface. The method comprises transferring the content of a high pressure canister of a two-component paint system according to above into the content of a medium pressure canister of the two-component paint system to form a paint mixture. The method optionally comprises shaking the paint mixture. The method also comprises applying the paint mixture onto the surface.

A further aspect of the embodiments relates to a paint coating obtainable by a process comprising transferring the content of a high pressure canister of a two-component paint system according to above into the content of a medium pressure canister of the two-component paint system to form a paint mixture. The process optionally comprises shaking the paint mixture. The process also comprises applying the paint mixture onto the surface.

A related aspect of the embodiments defines a surface, such as a metal, plastic, ceramic, wood, cellulose-based or glass fiber surface, comprising a paint coating according to above.

The two-component paint system of the embodiments produces paint coatings with improved characteristics in terms of, among others, adhesion, coverage, gloss and haze.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 2:
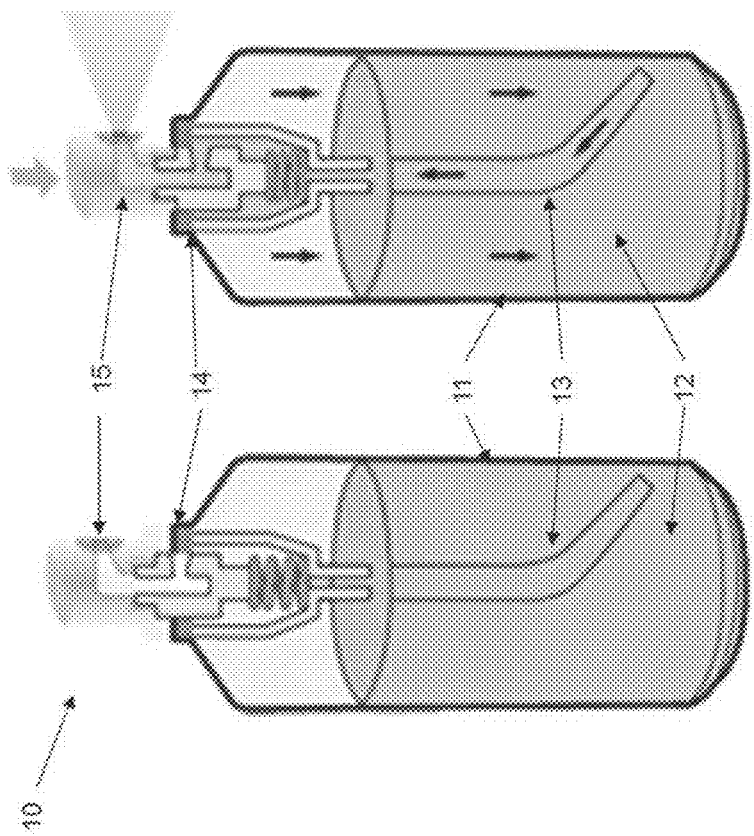
FIG. 2 schematically illustrates an embodiment of the medium pressure canister.

Throughout the drawings, the same reference numbers are used for similar or corresponding elements.

The present embodiments generally relate to a two-component paint system, and in particular to such a two-component paint system producing paint coatings with excellent characteristics.

The two-component paint system of the embodiments is able to produce paint coatings with excellent adhesive properties on various surfaces including, but not limited to, metal surfaces, plastic surfaces, ceramic surfaces, wood surfaces, cellulose or cellulose-based surfaces and glass fiber surfaces. The embodiments also provide efficient coverage on these surfaces and superior gloss and haze characteristics compared to relevant comparative products.

A further advantage of the embodiments is that the two-component paint system provides opportunities for specific optimization for different paint-hardener combinations, thereby enabling optimization of the end results for paint coatings of different such paint-hardener combinations.

An aspect of the embodiments thereby relates to a two-component paint system comprising a medium pressure canister, a high pressure canister and an adapter. The medium pressure canister comprises a paint, at least one solvent and at least one propellant. The high pressure canister comprises a hardener, at least one solvent, at least one propellant and an inert gas or inert gas mixture. The adapter of the two-component paint system is configured to transfer the content of the high pressure canister into the content of the medium pressure canister. The high pressure canister has an internal pressure that is at least 2 bars higher than the internal pressure of the medium pressure canister.

Thus, the two-component paint system comprises two canisters. The so-called medium pressure canister is also referred to as a first canister or paint canister since it comprises the paint component or ingredient of the two-component paint. The so-called high pressure canister is correspondingly also referred to as a second canister or hardener canister.

The pressure inside the high pressure canister is higher than the pressure inside the medium pressure canister with a delta or difference pressure of at least 2 bars. The pressures inside both canisters are preferably also higher than the ambient pressure, i.e. above 1 bar to enable the propellant to force the content of the respective canister out from the canister.

In a particular embodiment, the content, i.e. ingredients or chemicals, of the medium pressure canister consists of the paint, the at least one solvent and the at least one propellant (prior to any mixing). Correspondingly, the content of the high pressure canister consists, in a particular embodiment, of the hardener, the at least one solvent, the at least one propellant and the inert gas or inert gas mixture.

The canisters of the two-component pain system could be any canisters or cans traditionally used for spray paint systems and two-component paint systems. Non-limiting examples include tinplate cans, aluminum cans, plastic cans, etc.

FIG. 2 is a schematic example of a can that can be used as canister for one or both of the medium pressure canister and the high pressure canister, herein exemplified as the medium pressure canister 10. The medium pressure canister 10 comprises a housing 11 containing the content 12, i.e. the paint, at least one solvent and the at least one propellant, typically in the form of a liquefied gas/propellant mixture. The figure also shows a dip tube 13 connected to a nozzle 15. The interior of the housing 11 is sealed from the outside via a seal 14.

The adapter of the two-component paint system is used to transfer the content of the high pressure canister into the content of the medium pressure canister. In a particular embodiment, the adapter is configured to transfer the content of the high pressure canister into the medium pressure canister. Thus, in this embodiment, the mixing of the paint component, i.e. the content of the medium pressure canister, and the hardener component, i.e. the content of the high pressure canister, is taking place inside the medium pressure canister.

The pressure difference of at least 2 bars guarantees that the hardener component is efficiently transferred from the high pressure canister through the adapter and into the medium pressure canister. The pressure difference also prevents the paint component from unintentionally entering the high pressure canister when the adapter interconnects the two canisters.

Figure 1:
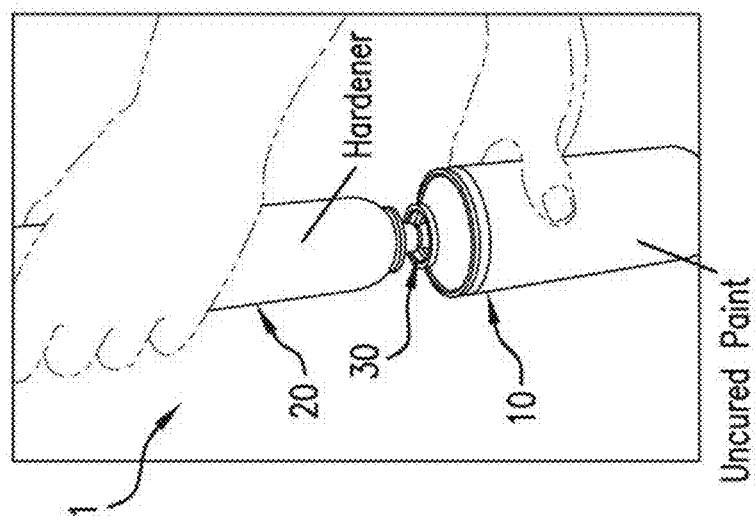
FIG. 1 schematically illustrates a two-component paint system according to an embodiment during the action of transferring the content of a high pressure canister into the content of a medium pressure canister.

FIG. 1 schematically illustrates a two-component paint system 1 with the adapter 30 arranged interconnecting the high pressure canister 20 and the medium pressure canister 10. At this arrangement the content of the high pressure canister 20 is transferred through the adapter 30 and into the medium pressure canister 10. There the hardener will mix with the uncured paint, preferably immediately prior to their application. The components can then be jointly sprayed from the medium pressure canister 10 onto a surface to be paint coated.

The adapter 30 of the two-component paint system 1 can be made of any solid material appropriate for the purpose of transferring the content of the high pressure canister 20 into the content of the medium pressure canister 10, preferably into the medium pressure canister 10. Suitable, but non-limiting, adapter materials include plastic; metal, such as steel; and ceramic. The adapter material should preferably not interact with, i.e. not react with or decompose or otherwise affect, the ingredients of the high pressure canister 20.

Figure 3:
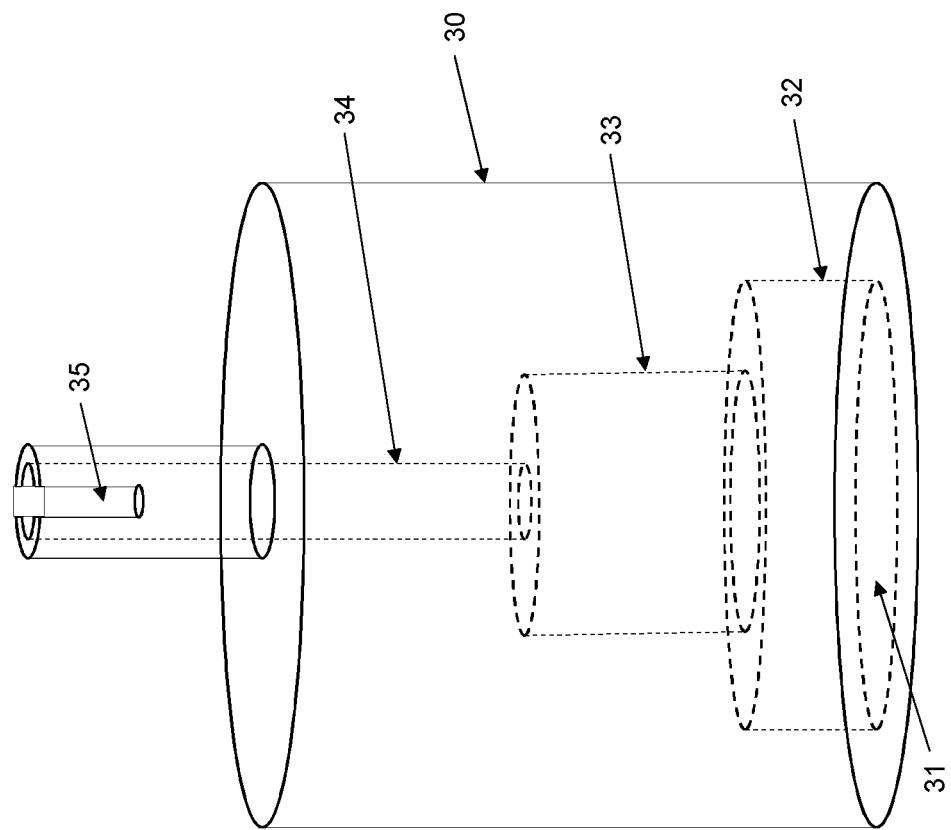
FIG. 3 schematically illustrates an embodiment of an adapter.

FIG. 3 is a schematic illustration of an example of an adapter 30 that can be used according to the embodiments. The adapter 30 comprises a needle part 35 adapted to be introduced into the female valve of the medium pressure canister. This needle part 35 is connected through an interconnecting part 34 with a female part 33 of the adapter 30. The valve stem of the high pressure canister is then introduced through a hole, opening or aperture 31 in the adapter 30 and a receiving part 32. By pressing the high pressure canister into the adapter 30 the valve stem enters the female part 33 and the valve of the high pressure canister is opened, allowing the contents of the high pressure canister to pass through the valve and through the interconnecting part 34 and into the medium pressure canister.

In an alternative embodiment, the two-component paint system further comprises a mixing and spraying canister. In such a case, the adapter is used to first interconnect the mixing and spraying canister and the medium pressure canister to allow the content of the medium pressure canister to pass through the adapter and into the mixing and spraying canister. Once the medium pressure canister has been emptied or at least sufficient amount of the paint component has been filled into the mixing and spraying canister the adapter or a second adapter is used to interconnect the mixing and spraying canister and the high pressure canister. The higher pressure inside the high pressure canister as compared to inside the mixing and spraying canister (at least 2 bars higher) forces the hardener component from the high pressure canister into the mixing and spraying canister. The paint component and the hardener component are then mixed in the mixing and spraying canister and then applied to a selected surface, preferably as a paint aerosol.

This variant of having three canisters in the two-component paint system is generally inferior as compared to only using the medium and high pressure canisters as described in the foregoing. The reason being that some paint component will still remain in the medium pressure canister thereby lowering the amount of paint that can be applied from the two-component paint system.

The at least one solvent of the two-component paint system is preferably selected from a group consisting of ketones, acetates, alcohols, aromatic solvents, ethers, water, aliphatic solvents and mixtures thereof.

Non-limiting, but preferred, examples ketones include acetone and methyl ethyl ketone.

Non-limiting, but preferred, examples acetates include 1-methoxy-2-propyl acetate and ethyl acetate.

Non-limiting, but preferred, examples alcohols include n-butanol.

Non-limiting, but preferred, examples aromatic solvents include xylene and ethylbenzene.

Non-limiting, but preferred, examples ethers include glycol ethers.

Non-limiting, but preferred, examples aliphatic solvents include heptane and pentane.

In a particular embodiment, the at least one solvent is selected from a group consisting of 1-methoxy-2-propyl acetate, xylene, ethylbenzene, n-butanol and mixtures thereof, preferably a mixture of 1-methoxy-2-propyle acetate, xylene and ethylbenzene or a mixture of xylene and n-butanol.

In a particular embodiment, the at least one solvent in the medium pressure canister and the at least one solvent in the high pressure canister are the same. Thus, in this embodiment the same solvent or solvent system or mixture is used in both canisters.

In an embodiment, the medium pressure canister comprises the at least one solvent at 1 to 20 weight % of the content of the medium pressure canister, preferably at 1 to 15 weight % of the content of the medium pressure canister, and more preferably at 5 to 10 weight % of the content of the medium pressure canister.

In an embodiment, the high pressure canister comprises the at least one solvent at 1 to 20 weight % of the content of the high pressure canister, preferably at 1 to 15 weight % of the content of the high pressure canister, more preferably at 3 to 10 weight % of the content of the high pressure canister, such as at 5 to weight % of the content of the high pressure canister.

In an embodiment, the at least one propellant is selected from a group consisting of butane, propane, dimethyl ether (DME), a fluorocarbon propellant, preferably trans-1,3,3,3-tetrafluoroprop-1-ene (HFO) or 1,1,1,2-tetrafluoroethane (HFC), and mixtures thereof.

In a particular embodiment, the at least one propellant is DME.

In an embodiment, the at least one propellant in the medium pressure canister and the at least one propellant in the high pressure canister are the same.

In an embodiment, the medium pressure canister comprises the at least one propellant at 20 to 50 weight % of the content of the medium pressure canister, preferably at 30 to 40 weight % of the content of the medium pressure canister.

In an embodiment, the high pressure canister comprises the at least one propellant at 30 to 70 weight % of the content of the high pressure canister, preferably at 40 to 70 weight % of the content of the high pressure canister, and more preferably at 50 to 60 weight % of the content of the high pressure canister.

The inert gas or the inert gas mixture of the high pressure canister is inert with regard to the content of the medium and high pressure canisters and preferably with regard to the paint and possibly also the hardener. Accordingly, the gas or gas mixture should preferably not significantly react with, decompose or otherwise negatively interact with the paint and possibly also the hardener.

In an embodiment, the inert gas or inert gas mixture is selected from a group consisting of nitrogen ($N_2$), carbon dioxide ($CO_2$), helium (He), neon (Ne), Argon (Ar) and Xenon (Xe). In a particular embodiment, the inert gas or inert gas mixture is $N_2$.

In an embodiment, the high pressure canister comprises the inert gas or inert gas mixture at 0.5 to 3 weight % of the content of the high pressure canister, preferably at 1 to 2 weight % of the content of the high pressure canister.

In an embodiment, the medium pressure canister comprises the paint at 40 to 80 weight % of the content of the medium pressure canister, preferably at 50 to 70 weight % of the content of the medium pressure canister.

In an embodiment, the high pressure canister comprises the hardener at 20 to 50 weight % of the content of the high pressure canister, preferably at 20 to 40 weight % of the content of the high pressure canister, and more preferably at 30 to 40 weight % of the content of the high pressure canister.

In an embodiment, the paint is a polyurethane-based paint and the hardener is then a hardener adapted for such polyurethane-based paints, preferably an isocyanate-based hardener.

In a particular embodiment with polyurethane-based paint and isocyanate-based hardener the content of the medium pressure canister comprises, preferably consists of:
 propellant 20-50 weight %, preferably 30-40 weight %;
 paint 40-80 weight %, preferably 50-70 weight %; and
 solvent 1-20 weight %, preferably 1-15 weight %, and more preferably 5-10 weight %,
and the content of the high pressure canister comprises, preferably consists of:
 propellant 30-70 weight %, preferably 40-70 weight % and more preferably 50-60 weight %;
 hardener 20-50 weight %, preferably 20-40 weight % and more preferably 30-40 weight %;
 solvent 1-20 weight %, preferably 1-15 weight %, and more preferably 3-10 weight %, such as 5-10 weight %; and
 inert gas 0.5-3 weight %, preferably 1-2 weight %.

In a particular embodiment relating to the types of paint and hardener mentioned above, the paint mixture obtained following transfer of the content of the high pressure canister into the content of the medium pressure canister comprises, preferably consists of (weight % of paint mixture):
 propellant: 28-40 weight %;
 hardener 7-10 weight %;
 paint 30-50 weight %;
 solvent 5-10 weight %; and
 inert gas 0.2-0.8 weight %.

In another embodiment, the paint is an epoxy phenolic-based paint and the hardener is then a hardener adapted for such epoxy phenolic-based paints, preferably a diamine-based hardener.

In a particular embodiment with epoxy phenolic-based paint and diamine-based hardener the content of the medium pressure canister comprises, preferably consists of:
 propellant 20-50 weight %, preferably 30-40 weight %;
 paint 40-80 weight %, preferably 50-70 weight %; and solvent 1-20 weight %, preferably 1-15 weight %, and more preferably 5-10 weight %, and the content of the high pressure canister comprises, preferably consists of:

propellant 30-70 weight %, preferably 40-70 weight % and more preferably 50-60 weight %;

hardener 20-50 weight %, preferably 20-40 weight % and more preferably 30-40 weight %;

solvent 1-20 weight %, preferably 1-15 weight %, and preferably 3-10 weight %, such as 5-10 weight %; and inert gas 0.5-3 weight %, preferably 1-2 weight %.

In a particular embodiment relating to the types of paint and hardener mentioned above, the paint mixture obtained following transfer of the content of the high pressure canister into the content of the medium pressure canister comprises, preferably consists of (weight % of paint mixture):

propellant: 28-40 weight %;
hardener 8-12 weight %;
paint 30-50 weight %;
solvent 4-9 weight %; and
inert gas 0.2-0.8 weight %.

In an embodiment, the internal pressure of the medium pressure canister is from 2 to 7 bars, preferably from 2 to 6 bars, and more preferably from 4 to 6 bars. The internal pressure of the high pressure canister is, in this embodiment, preferably from 5 to 15 bars, preferably from 6 to 9 bars with the proviso that the internal pressure of the high pressure canister is at least 2 bars higher than the internal pressure of the medium pressure canister.

In an embodiment, the two component paint system comprises, following transfer of the content of the high pressure canister into the content of the medium pressure canister to from a paint mixture:

paint at 30 to 50 weight % of the paint mixture;

hardener at 7 to 12 weight % of the paint mixture, preferably 7 to 10 weight % of the paint mixture or 8 to 12 weight % of the paint mixture;

at least one propellant at 28 to 40 weight % of the paint mixture;

at least one solvent at 4 to 10 weight % of the paint mixture, preferably at 5 to 10 weight % of the paint mixture or at 4 to 9 weight % of the paint mixture; and inert gas or inert gas mixture at 0.2 to 0.8 weight % of the paint mixture.

In an embodiment, the medium pressure canister comprises at least one mixing ball or bead. In another embodiment, the high pressure canister comprises at least one mixing ball or bead. In a further embodiment, the medium pressure canister comprises at least one mixing ball or bead and the high pressure canister comprises at least one mixing ball or bead.

The mixing balls or beads can be made of any suitable material that is compatible with the paint component and the hardener component. Non-limiting examples include plastic, metal and ceramic, such as steel. Suitable diameters for the mixing balls include 5 to 10 mm, such as around 7.5 mm.

For instance, steel balls, such as 1-5 steel balls, such as 2-4 steel balls or 3 steel balls, can be included inside the medium pressure canister to achieve a good agitation. Correspondingly, 1-5 steel balls, such as 1-3 steel balls or 1 steel ball is correspondingly included inside the high pressure canister. By listening to the sound of the steel ball(s) when shaking the high pressure canister, information regarding whether there is any hardener component left in the high pressure canister following transfer of the content of the high pressure canister into the content of the medium pressure canister is obtained.

Thus, the at least one mixing ball or bead in the medium pressure canister is preferably used to achieve good agitation and mixing, whereas the at least one mixing ball or bead in the high pressure canister is preferably used to verify transfer of all its content into the medium pressure canister.

The medium pressure canister can be filled with its content according to various embodiments. In a first embodiment, the paint is preferably first mixed with the at least one solvent in order to dilute and thin down the paint and thereby achieve a viscosity that is suitable for filling the medium pressure canister. The paint and solvent mixture is then filled into the medium pressure canister followed by adding the at least one propellant. In a second embodiment, the medium pressure canister is first filled with the at least one propellant and then with the paint and solvent mixture.

The high pressure canister can be filled with its content according to various embodiments. In a first embodiment, the high pressure canister is filled by, in the following order, the hardener, the at least one solvent, the at least one propellant and then finally the inert gas or inert gas mixture. In a second embodiment, the high pressure canister is filled by, in the following order, the hardener, the at least one propellant, the at least one solvent and then finally the inert gas or inert gas mixture. In a third embodiment, the high pressure canister is filled by, in the following order, the at least one solvent, the hardener, the at least one propellant and then finally the inert gas or inert gas mixture. In a fourth embodiment, the high pressure canister is filled by, in the following order, the at least one solvent, the at least one propellant, the hardener and then finally the inert gas or inert gas mixture. In a fifth embodiment, the high pressure canister is filled by, in the following order, the at least one propellant, the at least one solvent, the hardener and then finally the inert gas or inert gas mixture. In a sixth embodiment, the high pressure canister is filled by, in the following order, the at least one propellant, the hardener, the at least one solvent and then finally the inert gas or inert gas mixture.

In further embodiments, the hardener and the at least one solvent are first mixed to form a hardener and solvent mixture. In such a case, the high pressure canister is preferably filled by, in the following order, the hardener and solvent mixture, the at least one propellant and finally the inert gas or inert gas mixture. Alternatively, the high pressure canister is preferably filled by, in the following order, the at least one propellant, the hardener and solvent mixture and finally the inert gas or inert gas mixture.

Figure 11:
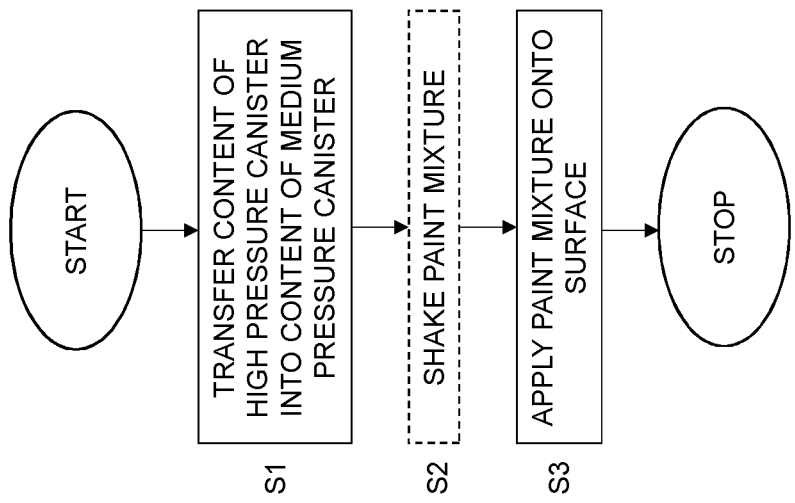
FIG. 11 is a flow chart illustrating a method of a metal or plastic surface according to an embodiment.

Another aspect of the embodiments relates to a method of coating a surface as shown in the flow chart of FIG. 11. The method starts in step S1, which comprises transferring the content of a high pressure canister of a two-component paint system of the embodiments into the content of a medium pressure canister of the two-component paint system to form a paint mixture. The method optionally comprises step S2, which comprises shaking the paint mixture. The following step S3 comprises applying the paint mixture onto the surface.

In an embodiment, step S1 comprises transferring the content of the high pressure canister into the content of the medium pressure canister by means of or using an adapter of the two-component paint system.

In an embodiment, step S1 comprises transferring the content of the high pressure canister into the medium pressure canister to form the paint mixture. In such a case, the optional step S2 preferably comprises shaking the medium pressure canister.

Step S2 facilitates mixing of the paint component and the hardener component and is particularly efficient if the medium pressure canister comprises at least one mixing ball or bead as previously described herein.

In an embodiment, step S3 comprises spraying the paint mixture as an aerosol form the medium pressure canister onto the surface.

Thus, in this embodiment an aerosol is used for application by spraying of the two-component paint.

In an embodiment, step S3 comprises applying the paint, such as in the form of a sprayed aerosol, onto a metal, plastic, ceramic, wood, cellulose-based or glass fiber surface. Thus, the two-component paint is in particular advantages for application to hard surfaces including metal or metal alloy surfaces, plastic surfaces, ceramic surfaces, wood surfaces, cellulose and cellulose-based surfaces and glass fiber surfaces. Generally, the two-component paint surface could be applied to any surface material that traditionally has been coated with two-component paints.

For instance, the two-component paint can be used to protect and restore small damages from corrosion, physical damages or graffiti on cars, boats or building. The two component paint may also be used to paint such cars, boats or buildings.

In the former case, the two-component paint could be regarded as a paint repair system used for performing paint repairs on metal auto bodies, such as steel, aluminum, zinc, and on plastic automotive components, such as polypropylene (PP), ethylene propylene diene monomer (EDPM) rubber, polyurethane (PU), polyamide (PA), polycarbonate (PC).

In an embodiment, the method comprises the usage of the medium pressure canister, the high pressure canister and the adapter of the two-component pain system as described in the foregoing.

A further aspect of the embodiments relates to a paint coating obtainable by a process comprising transferring the content of a high pressure canister of a two-component paint system according to the embodiments into the content of a medium pressure canister of the two-component paint system to form a paint mixture. The process optionally comprises shaking the paint mixture. The process also comprises applying the paint mixture onto a surface to form the paint coating.

The process according to this aspect may be performed as discussed above in connection with FIG. 11 including the various embodiments of steps S1 to S3.

The paint coatings obtainable according to this process have improved characteristics over paint coatings obtained using prior art two-component paint systems, which is further shown in the example section. Thus, the characteristics and properties of the paint coatings obtainable according to the present process are different from those achieved for prior art coatings in terms of at least one of adhesive properties, coverage properties, gloss properties and haze properties. Thus, the paint coatings obtainable according to the present process are different from the paint coatings of prior art two-component paint systems.

A related aspect of the embodiments is directed to a surface, preferably a metal, plastic, ceramic, wood, cellulose or cellulose-based or glass fiber surface, comprising a paint coating according to the aspect above.

Example

Super Match 2K Poly Urethane Paint

A tinplate can with measurements 65 mm×157 mm and a Lindal female valve was used as medium pressure canister. The paint INTERTHANE 990 RAL7035 LIGHT GREY PHD704 (International Paint Ltd.) was diluted with about 10% solvent THINNER GTA713 (International Paint Ltd.). Hence, 115 g paint (92 ml) and 11.5 g solvent (13 ml) gave a solution of 105 ml. The recommendation for filling the two-component paint system of the embodiments is about 100 ml.

The can was filled with 65 g dimethyl ether followed by the diluted paint using a Fill one system from Fillon Technologies.

The high pressure canister comprises the hardener, solvent, propellant and inert gas. The general idea for the Super Match 2K system is that the medium pressure canister is very similar for every paint system or type, while high pressure canister with the hardener, is the part that differs between the systems or types.

For 2K polyurethane paint it is recommended to have a ratio of 6:1 (volume parts) between paint and hardener. In order to compensate for any hardener left in the high pressure canister or adapter following content transfer, the hardener amount was increased to 4:1.

The high pressure canister was in the form of an aluminum can with the measurements 45 mm×190 mm and a Precision male valve with a stem flow of 3×0.050". The aluminum can was filled with 48 g dimethyl ether and 5 g THINNER GTA713 (International Paint Ltd.) and then the hardener INTERTHANE 990 PHA046 (International Paint Ltd) at an amount of 26 g (24 ml). In order to increase the pressure inside the high pressure canister above the pressure inside the medium pressure canister, nitrogen ($N_2$) was added in the amount of 1.5 g giving an internal pressure of about 8 bars.

Super Match 2K Epoxy 740 Paint

A tinplate can with measurements 65 mm×157 mm and a Lindal female valve was used as medium pressure canister. The paint INTERGARD 740 BLACK ELZ999 EAC106 (International Paint Ltd.) was diluted with about 9.4% solvent GTA220 International Thinner (International Paint Ltd.). Hence, 125 g paint (86 ml) and 13 g solvent (15 ml) gave a solution of 101 ml. The recommendation for filling the two-component paint system of the embodiments is about 100 ml.

The can was filled with 65 g dimethyl ether followed by the diluted paint using a Fill one system from Fillon Technologies.

For 2K Epoxy Phenolic paint it is recommended to have a ratio of 4:1 (volume parts) between paint and hardener. In order to compensate for any hardener left in the high pressure canister or adapter following content transfer, the hardener amount was increased to 3:1.

The high pressure canister was in the form of an aluminum can with the measurements 45 mm×190 mm and a Precision male valve with a stem flow of 3×0.050". The aluminum can was filled with 46 g dimethyl ether and 3 g GTA220 International Thinner (International Paint Ltd.) and then the hardener INTERGARD 740 ECA914 (International Paint Ltd) at an amount of 30 g (32 ml). In order to increase the pressure inside the high pressure canister above the pressure inside the medium pressure canister, nitrogen ($N_2$) was added in the amount of 1.5 g giving an internal pressure of about 8 bars.

Reference Two-Component Paint System

MIPA 2K-Prefilled Spray Lack-Spray (250 ml) from MIPA AG was used as reference two-component paint system. This aerosol has a universal hardener that should work for both epoxy and polyurethane paint systems. The paint filling process is similar to the embodiment, where 100 ml paint is filled into the can using a machinery, such as Fillon Technologies or similar.

Paint—Hardener Mixing

The content of the high pressure canister was transferred into the medium pressure canister as shown in FIG. 1 using an adapter as shown in FIG. 3. Following transfer the medium pressure canister was shaken to promote mixing of the ingredients. The medium pressure canister contained three steel balls of diameter 7.5 mm and density 7.8 g/cm$^3$ to facilitate efficient agitation and mixing. The high pressure canister contained a single steel ball used to verify emptying of the high pressure canister.

Coverage

Figure 4:
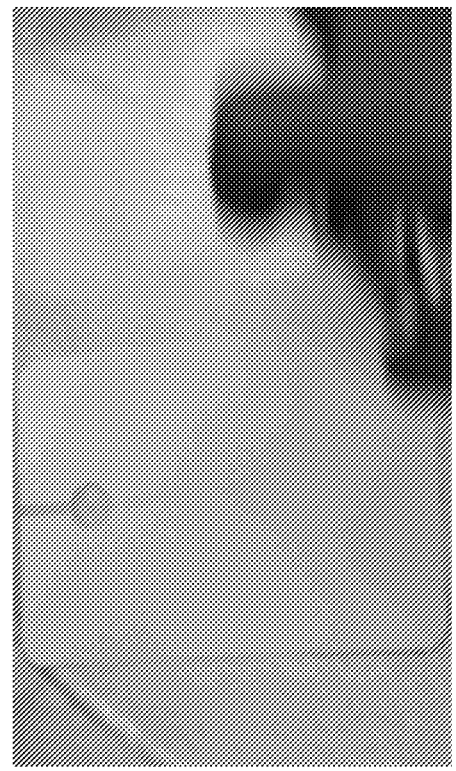
FIG. 4 schematically illustrates application of a paint mixture onto a surface.

Coverage was compared between the two-component paint system of the embodiments and the reference two-component paint system from MIPA AG by counting the number of strokes of spraying paint needed until black markings on a coverage plate were no longer visible. The application was made at a distance of 15-20 cm, in smooth sweeps at a velocity of 0.5 m/s, see FIG. 4. The spray rate was about 1.5-2.0 g/s.

Figure 7:
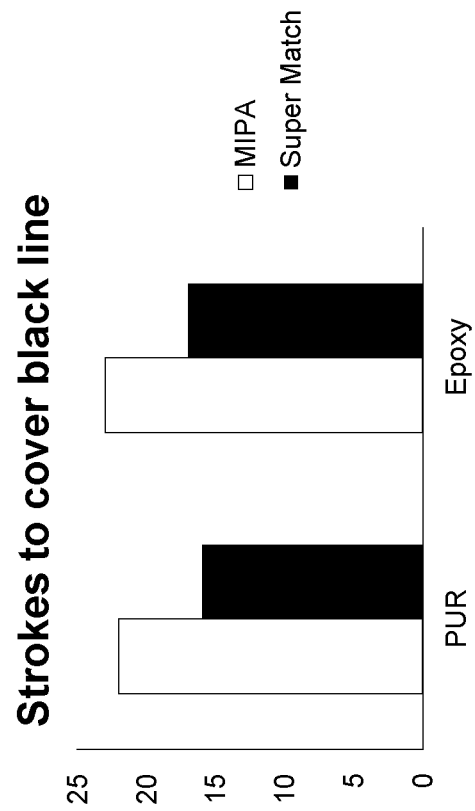
FIG. 7 is a diagram showing results from a paint cover test comparing embodiments with prior art.

FIG. 7 illustrates the results of the coverage test comparing the two-component paint system of the embodiments filled with Super Match 2K Poly Urethane (PUR) or Super Match 2K Epoxy 740 (Epoxy) with the reference two-component paint system (MIPA) filled with corresponding polyurethane or epoxy based paints.

The present embodiments achieve a much better and more efficient coverage as compared to the reference two-component paint system.

Adhesion

Figure 5:
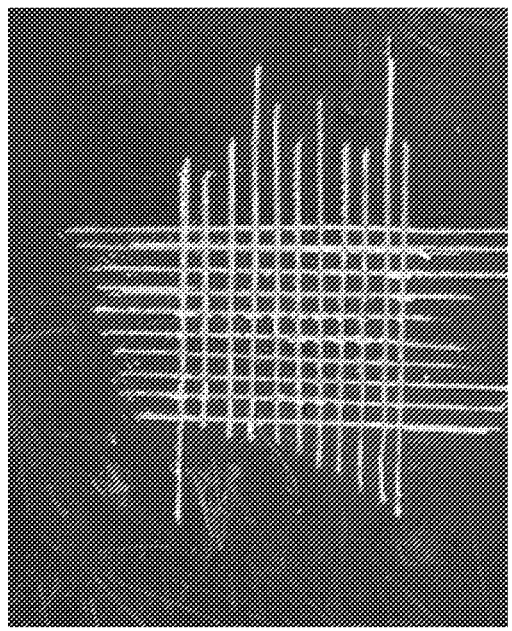
FIG. 5 illustrates cuts made in a fully hardened paint surface in an adhesion test.

Adhesion was tested by making cuts with a scalpel in a fully hardened paint. In total 10 horizontal and 10 vertical notches were made with a 1 mm distance between adjacent notches to form a matrix with 1 mm$^2$ squares in a 1 cm$^2$ area, see FIG. 5. The cuts were made completely thorough the paint and into the tinplate substrate below. A stickiness tape was then applied onto the matrix and ripped off. By calculating the number of 1 mm$^2$ squares where the paint still remained, a percentage value was obtained.

Figure 10:
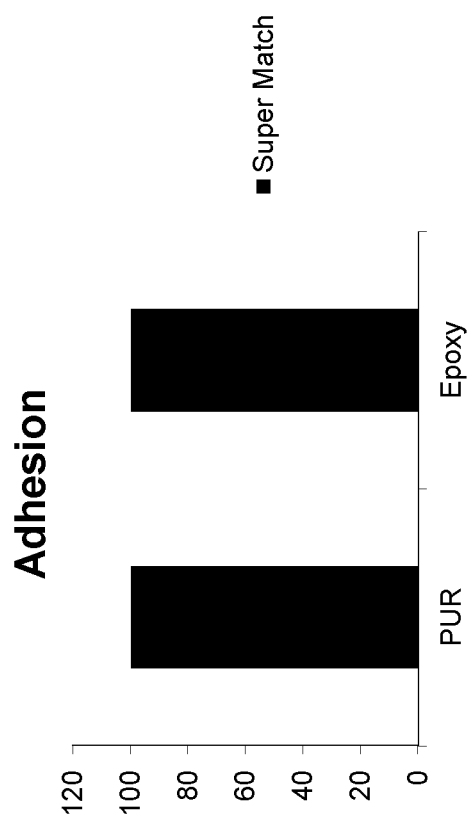
FIG. 10 is a diagram showing adhesion achieved according to embodiments.

FIG. 10 shows the result of the adhesion test. Both the polyurethane and epoxy paint system of the embodiments had 100% adhesion to the substrate surface.

Haze and Gloss

Reflection haze is an optical phenomenon usually associated with high gloss surfaces. It reduces appearance quality.

Haze can be described as near specular reflection. It is caused by a microscopic surface structure which slightly changes the direction of a reflected light causing a bloom adjacent to the specular (gloss) angle. In the coating industry, this microscopic surface texture is often due to poorly dispersed raw materials, incompatible raw materials or oxidization and weathering.

In the analysis between the reference two-component pain system and the two-component paint systems of the embodiments the formulas below were used:

$$\text{Haze} = 100 \times \frac{\sum \text{pixels from } 17° \text{ to } 19° \text{ (sample)} + \sum \text{pixels from } 21° \text{ to } 23° \text{ (sample)}}{\text{Specular Gloss (Standard)}}$$

$$\log\text{Haze} = 1285 \times \log_{10}\left(\frac{\text{Haze}}{20} + 1\right)$$

The gloss values were obtained using a Rhopoint IQ gloss meter, where gloss values were measured in two angles 20° and 60°. Each value was measured three times. The device was also used for haze measurements.

Figure 9:
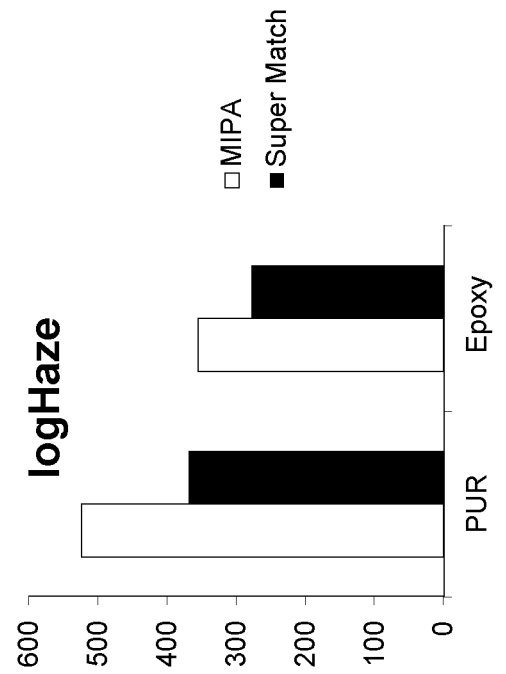
FIG. 9 is a diagram showing results of a haze test comprising embodiments with prior art.

FIG. 9 is a diagram showing log Haze values for the embodiments and the reference two-component paint system. The higher log Haze value the lower quality paint surface. The two-component paint system of the embodiments outperforms the reference two-component paint system with regard to haze characteristics.

Figure 6:
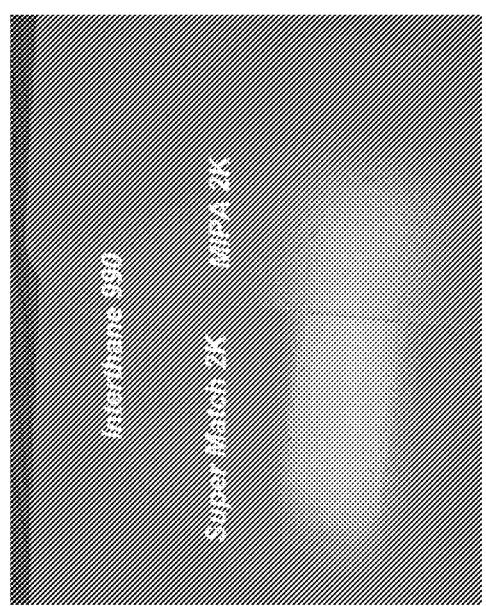
FIG. 6 is a comparison of paint coatings according to the embodiments and according to prior art as used in a gloss test.
Figure 8:
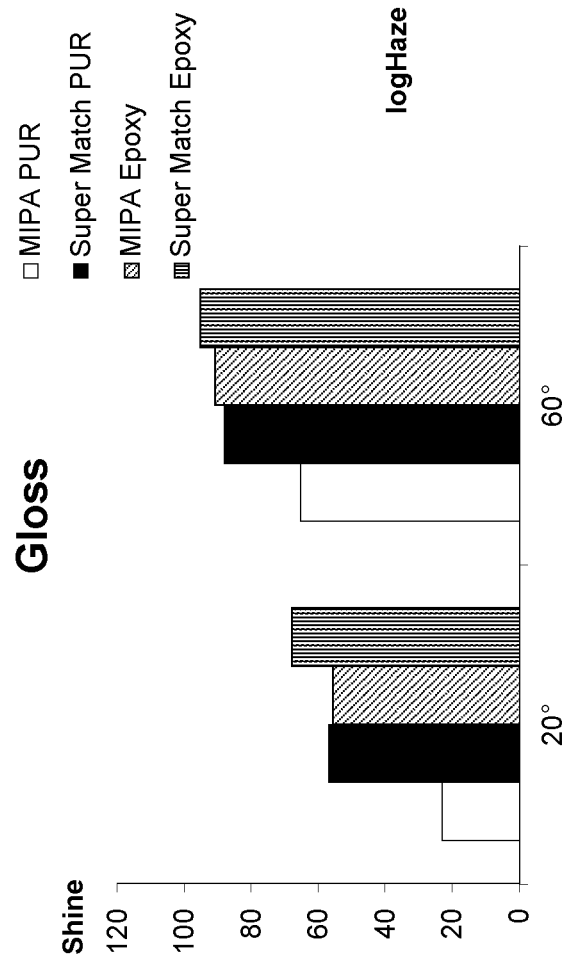
FIG. 8 is a diagram showing results from a gloss test comparing embodiments with prior art.

FIG. 6 is a picture comparing the results achieved according to the embodiments (Super Match 2K) and the reference two-component paint system (MIPA 2K) for the polyurethane paint. FIG. 8 illustrates the results from the gloss measurements.

Gloss is a measurement proportional to the amount of light reflected from a surface. The correct measurement geometry should be used according to the sample finish—mid gloss: 60°. The two-component paint system of the embodiments and the reference two-component paint system are mid gloss.

MEK Test

A two-component paint according to an embodiment was compared to a two-component paint according to DE 10 2013 019 085 in a MEK test to assess the resistance to wear and degree of cure for the two-component paints.

Six 300 ml cans with INTERZONE® 3507 Aluminium Part A (primer, EAA541) and six 100 ml cans with INTERZONE® 3507 Part B (hardener, EAA546) were used in the present example.

The INTERZONE® 3507 Part B hardener was filled according to the disclosure in DE 10 2013 019 085, i.e. without addition of any DME propellant or any solvent, i.e. only 35.1 g hardener, for three of the six 100 ml cans. The INTERZONE® 3507 Part B hardener was filled according to the embodiments, i.e. 35.1 g hardener, 39.0 g DME propellant and 3.9 g International Thinner GTA713, for the remaining three of the six 100 ml cans. These six cans were pressurized using 1.2 g N$_2$ to form the high pressure cans.

The contents from high pressure cans were transferred into the medium pressure cans (six 300 ml cans) with INTERZONE® 3507 Aluminium Part A paint using an adapter as shown in FIG. 3 during 45 s. Thereafter, the cans were shaken for 60 s in order facilitate mixing of the hardener and paint components.

Two tin plate test charts or panels were painted with a spray nozzle 14831—LINDAL actuator RED 320 025 FAN 030 INS.BLACK and one paper test chart was painted with a spray nozzle 14345—LINDAL actuator BLACK 320 018 FAN 024 INS.YELLOW.

A MEK test (ASTM D4752) was performed after 3 days. The MEK test involved stroking a cheesecloth soaked with methyl ethyl ketone (MEK) until failure or breakthrough of the film occurred. Basically, the tin plate test charts were rubbed with the soaked cheesecloth in a back and forth motion in a straight line using a 0.5-1.0 kg weight of pressure. This procedure was performed 100 times (strokes, with one stroke being one forward and one backward rub) or until failure of the film.

Figure 12:
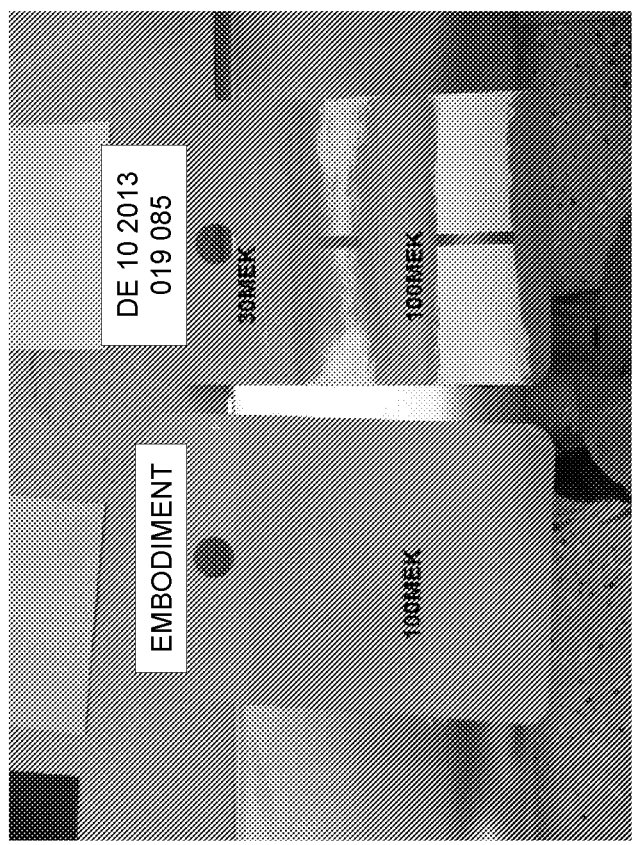
FIG. 12 schematically illustrates the result of a MEK test comparing an embodiment with prior art.

The paint according to DE 10 2013 019 085 only passed 30 strokes in the MEK test, whereas the paint according to the embodiment passed more than 100 strokes, see FIG. 12 and Table 1. The color was the same for paint of the embodiment as for the paint of DE 10 2013 019 085 in a comparison between the paper test chart.

Only about 26% hardener was transferred from the high pressure can to the medium pressure can for DE 10 2013 019 085, whereas about 95% of the hardener was successfully transferred according to the embodiment, see Table 1.

TABLE 1

Comparison of two-component paint systems

| | Initial weight (g) | Weight after 45 s transfer (g) | Transferred amount (g) | Actual filled amount (g) | MEK test (no. of strokes) |
|---|---|---|---|---|---|
| Embodiment | | | | | |
| INTERZONE ® 3507 Part B | 115.9 | 40.8 | 75.1 | 79.12 (94.92%) | 100 |
| INTERZONE ® 3507 Part A | 303.5 | 378.7 | 75.2 | | |
| DE 10 2013 019 085 | | | | | |
| INTERZONE ® 3507 Part B | 74.1 | 64.6 | 9.5 | 36.26 (26.20%) | 30 |
| INTERZONE ® 3507 Part A | 302.8 | 312.4 | 9.6 | | |

Thus, the two-component paint system of DE 10 2013 019 085 is not suitable for two-component paints with high viscosity hardeners, such as INTERZONE® 3507 Part B hardener. As a consequence, a major part (74%) of the hardener is left in the high pressure canister following connecting the high pressure canister with the medium pressure canister. According to the present embodiment, almost 95% of the hardener component is transferred to the medium pressure canister. The prior art two-component paint has significantly inferior resistance to wear and degree of cure as assessed in a MEK test as compared to the present embodiment.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A two-component paint system comprising:
a medium pressure canister comprising:
　a paint;
　at least one solvent; and
　at least one propellant at 20 to 50 weight % of the content of said medium pressure canister;
a high pressure canister comprising:
　a hardener;
　at least one solvent;
　at least one propellant at 30 to 70 weight % of the content of said high pressure canister; and
　an inert gas or inert gas mixture; and
an adapter configured to transfer said content of said high pressure canister into said content of said medium pressure canister, wherein said high pressure canister has an internal pressure that is at least 2 bars higher than an internal pressure of said medium pressure canister.

2. The two-component paint system according to claim 1, wherein said at least one solvent is selected from the group consisting of ketones, acetates, alcohols, aromatic solvents, ethers, water, aliphatic solvents and mixtures thereof.

3. The two-component paint system according to claim 2, wherein said at least one solvent is selected from the group consisting of 1-methoxy-2-propyl acetate, xylene, ethylbenzene, n-butanol and mixtures thereof.

4. The two-component paint system according to claim 3, wherein said at least one solvent is selected from the group consisting of a mixture of 1-methoxy-2-propyl acetate, xylene and ethylbenzene and a mixture of xylene and n-butanol.

5. The two-component paint system according to claim 1, wherein said at least one solvent in said medium pressure canister and said at least one solvent in said high pressure canister are the same.

6. The two-component paint system according to claim 1, wherein said medium pressure canister comprises said at least one solvent at 1 to 20 weight % of said content of said medium pressure canister.

7. The two-component system according to claim 6, wherein said medium pressure canister comprises said at least one solvent at 1 to 15 weight % of said content of said medium pressure canister.

8. The two-component system according to claim 7, wherein said medium pressure canister comprises said at least one solvent at 5 to 10 weight % of said content of said medium pressure canister.

9. The two-component paint system according to claim 1, wherein said high pressure canister comprises said at least one solvent at 1 to 20 weight % of said content of said high pressure canister.

10. The two-component paint system according to claim 9, wherein said high pressure canister comprises said at least one solvent at 1 to 15 weight % of said content of said high pressure canister.

11. The two-component paint system according to claim 10, wherein said high pressure canister comprises said at least one solvent at 3 to 10 weight % of said content of said high pressure canister.

12. The two-component paint system according to claim 11, wherein said high pressure canister comprises said at least one solvent at 5 to 10 weight % of said content of said high pressure canister.

13. The two-component paint system according to claim 1, wherein said at least one propellant is selected from the group consisting of butane, propane, dimethyl ether (DME), a fluorocarbon propellant, preferably trans-1,3,3,3-tetrafluoroprop-1-ene (HFO) or 1,1,1,2-tetrafluoroethane (HFC), and mixtures thereof.

14. The two-component paint system according to claim 13, wherein said at least one propellant is DME.

15. The two-component paint system according to claim 1, wherein said at least one propellant in said medium pressure canister and said at least one propellant in said high pressure canister are the same.

16. The two-component paint system according to claim 1, wherein said medium pressure canister comprises said at least one propellant at 30 to 40 weight % of said content of said medium pressure canister.

17. The two-component paint system according to claim 1, wherein said high pressure canister comprises said at least one propellant at 40 to 70 weight % of said content of said high pressure canister.

18. The two-component paint system according to claim 1, wherein said high pressure canister comprises said at least one propellant at 50 to 60 weight % of said content of said high pressure canister.

19. The two-component paint system according to claim 1, wherein said inert gas or inert gas mixture is selected from the group consisting of nitrogen ($N_2$), carbon dioxide ($CO_2$), helium (He), neon (Ne), argon (Ar) and Xenon (Xe).

20. The two-component paint system according to claim 19, wherein said inert gas or inert gas mixture is $N_2$.

21. The two-component paint system according to claim 1, wherein said high pressure canister comprises said inert gas or inert gas mixture at 0.5 to 3 weight % of said content of said high pressure canister.

22. The two-component paint system according to claim 21, wherein said high pressure canister comprises said inert gas or inert gas mixture at 1 to 2 weight % of said content of said high pressure canister.

23. The two-component paint system according to claim 1, wherein said medium pressure canister comprises said paint at 40 to 80 weight % of said content of said medium pressure canister.

24. The two-component paint system according to claim 23, wherein said medium pressure canister comprises said paint at 50 to 70 weight % of said content of said medium pressure canister.

25. The two-component paint system according to claim 1, wherein said high pressure canister comprises said hardener at 20 to 50 weight % of said content of said high pressure canister.

26. The two-component paint system according to claim 25, wherein said high pressure canister comprises said hardener at 20 to 40 weight % of said content of said high pressure canister.

27. The two-component paint system according to claim 26, wherein said high pressure canister comprises said hardener at 30 to 40 weight % of said content of said high pressure canister.

28. The two-component paint system according to claim 1, wherein
said paint is a polyurethane-based paint; and
said hardener is an isocyanate-based hardener.

29. The two-component paint system according to claim 1, wherein
said paint is an epoxy phenolic-based paint; and
said hardener is a diamine-based hardener.

30. The two-component paint system according to claim 1, wherein
said internal pressure of said medium pressure canister is from 2 to 7 bars; and
said internal pressure of said high pressure canister is from 5 to 15 bars with the proviso that said internal pressure of said high pressure canister is at least 2 bars higher than said internal pressure of said medium pressure canister.

31. The two-component paint system according to claim 30, wherein said internal pressure of said medium pressure canister is from 2 to 6 bars.

32. The two-component paint system according to claim 31, wherein said internal pressure of said medium pressure canister is from 4 to 6 bars.

33. The two-component paint system according to claim 30, wherein said internal pressure of said high pressure canister is from 6 to 9 bars with the proviso that said internal pressure of said high pressure canister is at least 2 bars higher than said internal pressure of said medium pressure canister.

34. The two-component paint system according to claim 1, wherein said adapter is configured to transfer said content of said high pressure canister into said medium pressure canister.

35. The two-component paint system according to claim 1, wherein said medium pressure canister comprises at least one mixing ball.

36. The two-component paint system according to claim 1, wherein said high pressure canister comprises at least one mixing ball.

37. The two-component paint system according to claim 1, wherein said two-component paint system comprises, following transfer of said content of said high pressure canister into said content of said medium pressure canister to form a paint mixture:
said paint at 30 to 50 weight % of said paint mixture;
said hardener at 7 to 12 weight % of said paint mixture;
said at least one propellant at 28 to 40 weight % of said paint mixture;
said at least one solvent at 4 to 10 weight % of said paint mixture; and
said inert gas or inert gas mixture at 0.2 to 0.8 weight % of said paint mixture.

38. The two-component paint system according to claim 37, wherein said two-component paint system comprises, following transfer of said content of said high pressure canister into said content of said medium pressure canister to form a paint mixture, said hardener at 7 to 10 weight % of said paint mixture.

39. The two-component paint system according to claim 37, wherein said two-component paint system comprises, following transfer of said content of said high pressure canister into said content of said medium pressure canister to form a paint mixture, said hardener at 8 to 12 weight % of said paint mixture.

40. The two-component paint system according to claim 37, wherein said two-component paint system comprises, following transfer of said content of said high pressure canister into said content of said medium pressure canister to form a paint mixture, said at least one solvent at 5 to 10 weight % of said paint mixture.

41. The two-component paint system according to claim 37, wherein said two-component paint system comprises, following transfer of said content of said high pressure canister into said content of said medium pressure canister to form a paint mixture, said at least one solvent at 4 to 9 weight % of said paint mixture.

42. A method of coating a surface, comprising:
transferring the content of a high pressure canister of a two-component paint system according to claim 1 into the content of a medium pressure canister of said two-component paint system to form a paint mixture;
optionally shaking said paint mixture; and
applying said paint mixture onto said surface.

43. The method according to claim 42, wherein
transferring said content comprises transferring said content of said high pressure canister into said medium pressure canister to form said paint mixture; and
optionally shaking said paint mixture comprises optionally shaking said medium pressure canister.

44. The method according to claim 43, wherein applying said paint mixture comprises spraying said paint mixture as an aerosol from said medium pressure canister onto said surface.

45. The method according to claim 42, wherein applying said paint mixture comprises applying said paint onto a metal, plastic, ceramic, wood, cellulose-based or glass fiber surface.

* * * * *

UNITED STATES PATENT AND TRADEMARK OFFICE
CERTIFICATE OF CORRECTION

PATENT NO. : 10,799,842 B2  
APPLICATION NO. : 15/565881  
DATED : October 13, 2020  
INVENTOR(S) : Carl Tommy Wikstrand et al.

Page 1 of 1

It is certified that error appears in the above-identified patent and that said Letters Patent is hereby corrected as shown below:

On the Title Page

Item (30), change "1550507" to --1550507-6--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*